US012784414B2

(12) United States Patent
Heo et al.

(10) Patent No.: US 12,784,414 B2
(45) Date of Patent: Nov. 3, 2026

(54) APPARATUS AND METHOD FOR ENHANCING TRAINING DATA

(71) Applicant: HYUNDAI AUTOEVER CORP., Seoul (KR)

(72) Inventors: Minoh Heo, Seoul (KR); Jaeyong Park, Seoul (KR); Saehyeon Kim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 272 days.

(21) Appl. No.: 18/538,667

(22) Filed: Dec. 13, 2023

(65) Prior Publication Data

US 2024/0203102 A1 Jun. 20, 2024

(30) Foreign Application Priority Data

Dec. 16, 2022 (KR) ........................ 10-2022-0177317

(51) Int. Cl.
*G06V 10/774* (2022.01)
*G06T 11/00* (2006.01)
(Continued)

(52) U.S. Cl.
CPC ............ *G06V 10/774* (2022.01); *G06T 11/00* (2013.01); *G06V 10/761* (2022.01);
(Continued)

(58) Field of Classification Search
CPC .. G06V 10/774; G06V 10/761; G06V 10/764; G06V 10/776; G06V 10/82;
(Continued)

(56) References Cited

U.S. PATENT DOCUMENTS 10,373,023 B1 * 8/2019 Kim ........................ G06T 7/246
2007/0258658 A1 * 11/2007 Kobayashi ............. G06T 15/20
382/276

(Continued)

FOREIGN PATENT DOCUMENTS

KR 101964282 B1 4/2019

OTHER PUBLICATIONS

Zhang et al, A Curriculum Domain Adaptation Approach to the Semantic Segmentation of Urban Scenes, 2019, arXiv:1812.09953v3, pp. 1-19. (Year: 2019).*

(Continued)

*Primary Examiner* — Kathleen M Broughton
(74) *Attorney, Agent, or Firm* — Lempia Summerfield Katz LLC

(57) ABSTRACT

An apparatus for enhancing training data includes a memory having a program stored thereon. The apparatus also includes a processor coupled to the memory and configured to execute the program. The processor is configured to generate a plurality of virtual images based on a real image. The processor is also configured to generate, based on respective levels of similarity between the real image and virtual images among the plurality of virtual images, a golden pair that pairs the real image with a virtual image among the plurality of virtual images. The processor is further configured to perform domain adaptation training on the real image and the virtual image that is paired with the real image.

8 Claims, 7 Drawing Sheets

(51) Int. Cl.
*G06V 10/74* (2022.01)
*G06V 10/764* (2022.01)
*G06V 10/776* (2022.01)
*G06V 20/70* (2022.01)

(52) U.S. Cl.
CPC .......... *G06V 10/764* (2022.01); *G06V 10/776* (2022.01); *G06V 20/70* (2022.01)

(58) Field of Classification Search
CPC ........ G06V 10/98; G06V 20/70; G06T 11/00; G06N 3/0464; G06N 3/094
See application file for complete search history.

(56) References Cited

U.S. PATENT DOCUMENTS

| | | | | |
|---|---|---|---|---|
| 2018/0330205 | A1* | 11/2018 | Wu | G06F 18/2148 |
| 2019/0171223 | A1* | 6/2019 | Liang | G06F 18/2185 |
| 2022/0027671 | A1* | 1/2022 | Mukherjee | G06V 20/20 |
| 2022/0156580 | A1* | 5/2022 | Chao | G06F 17/18 |
| 2022/0156971 | A1* | 5/2022 | Guizilini | G06V 10/82 |
| 2023/0360366 | A1* | 11/2023 | Sibille | G06F 18/24133 |

OTHER PUBLICATIONS

Hu et al, DASGIL: Domain Adaptation for Semantic and Geometric-Aware Image-Based Localization, IEEE Transactions on Image Processing 30(2021):1342-1353. (Year: 2020).*

Bousmalis et al, Unsupervised pixel-Level Domain Adaptation with Generative Adversarial Networks, 2017, arXiv:1612.05424v2, pp. 1-15. (Year: 2017).*

Deng et al, Rethinking Triplet Loss for Domain Adaptation, 2020, IEEE Transactions on Circuits and Systems for Video Technology, 31(1): 29-37. (Year: 2020).*

* cited by examiner

APPARATUS AND METHOD FOR ENHANCING TRAINING DATA

CROSS-REFERENCE TO RELATED APPLICATION

This application claims the benefit of and priority to Korean Patent Application No. 10-2022-0177317, filed on Dec. 16, 2022, the entire contents of which are hereby incorporated by reference.

TECHNICAL FIELD

The present disclosure relates to an apparatus and a method for enhancing training data.

BACKGROUND

In recent years, vision testing for determining good quality and poor quality that uses deep learning technologies has been conducted.

In order to conduct the deep learning-based vision testing for determining good quality and poor quality, it is necessary to obtain various training data representing features of a testing target. Sufficient amounts of normal data and abnormal (defective) data need to be obtained in a state where a balance is struck between the normal data and the abnormal (defective) data. Furthermore, various normal cases and abnormal (defective) cases need to be obtained. When the numbers of samples of trading data on all training-target objects are similar, the strongest effect can be achieved.

However, in many cases, although numerous abnormal (defective) situations are present, the testing-target objects are normal. For this reason, it is difficult to sufficiently obtain data on the abnormal (defective) situations that need to be detected. Significant amounts of time and manpower are necessary to establish training samples that achieve a balance in data on the real world. In some cases, it is impossible to do so.

In addition, currently, a sufficient amount of training data is not readily available in most industrial fields where open data sets or images are difficult to obtain. For this reason, it is difficult to advance the performance in artificial intelligence.

SUMMARY

Accordingly, technologies that can solve a problem of an imbalance in data on the real world by obtaining training data at a level of being applicable to artificial intelligence training are needed, particularly in the fields where the images are difficult to obtain.

Various embodiments are directed to an apparatus and a method for enhancing training data. The apparatus and the method are capable of solving a problem of an imbalance in data on the real world by obtaining training data at a level of being applicable to artificial intelligence training.

According to an embodiment, an apparatus for enhancing training data is disclosed. The apparatus includes a memory having a program stored thereon. The apparatus also includes a processor coupled to the memory and configured to execute the program. The processor is configured to generate a plurality of virtual images based on a real image. The processor is also configured to generate, based on respective levels of similarity between the real image and virtual images among the plurality of virtual images, a golden pair that pairs the real image with a virtual image among the plurality of virtual images. The processor is further configured to perform domain adaptation training on the real image and the virtual image that is paired with the real image.

In an embodiment, the processor may be configured to generate the plurality of virtual images based on the real image by changing at least one of a distance, a pitch, or a yaw, with respect to the real image.

In an embodiment, the processor may be configured to label real image, virtual images, normal data, and abnormal data.

In an embodiment, the processor may be configured to compute a level of similarity between the real image and each of the virtual images generated based on the real image. The processor may pair the real image with a virtual image having a highest level of similarity with the real image, thereby generating the golden pair that pairs the real image with the virtual image.

In an embodiment, the processor may be further configured to perform domain adversarial training.

In an embodiment, the processor may be configured to convert the real image and the virtual image, that is paired with the real image, into vectors. The processor may also be configured to perform triplet loss on the golden pair of the real image and the virtual image, among the vector-converted images. The processor may further be configured to cause, using a first classifier, the triplet loss-performed images to be classified into normal images and abnormal images. The processor may additionally be configured to cause, using a second classifier, the triplet loss-performed images to be indistinguishable between the virtual image and the real image.

According to another embodiment, a method for enhancing training data is provided. The method include generating, by a processor, a plurality of virtual images based on a real image. The method also includes generating, by the processor, based on respective levels of similarity between the real image and virtual images among the plurality of virtual images, a golden pair that pairs the real image with a virtual image among the plurality of virtual images. The method may additionally include performing, by the processor, domain adaptation training on the real image and the virtual image that is paired with the real image.

In an embodiment, generating the plurality of virtual images may include generating the plurality of virtual images based on the real image by changing at least one a distance, a pitch, or a yaw, with respect to the real image.

In an embodiment, generating the plurality of virtual images may include labeling real image, virtual images, normal data, and abnormal data.

In an embodiment, generating the golden pair may include computing a level of similarity between the real image and each of the virtual images generated based on the real image, and pairing the real image with a virtual image having a highest level of similarity with the real image, thereby generating the golden pair that pairs the real image with the virtual image.

In an embodiment, performing the domain adaptation training may comprise performing domain adversarial training.

In an embodiment, performing the domain adaptation training may include converting the real image and the virtual image that is paired with the real image into vectors. Performing the domain adaptation training may also include performing triplet loss on the golden pair of the real image and the virtual image, among the vector-converted images. Performing the domain adaptation training may further include causing, using a first classifier, the triplet loss-performed images to be classified into normal images and abnormal images. Performing the domain adaptation training may additionally include causing, using a second classifier, the triplet loss-performed images to be indistinguishable between the virtual image and the real image.

The apparatus and the method for enhancing training data according to embodiments of the present disclosure can perform the domain adaptation training by generating the virtual image based on the real image and generating triplet loss-based golden pair. As a result, the real image and the virtual image are compatible with each other. Thus, data on the real image and the virtual can be efficiently used together. Furthermore, good-quality training data on various cases (a normal case and an abnormal case) can be obtained.

The apparatus and the method for enhancing training data according to embodiments of the present disclosure can solve the problem of an imbalance in data on the real world and can reduce work man-hours necessary to generate training data. This can be achieved by obtaining the training data at a level of being applicable to artificial imbalance training.

The apparatus and the method for enhancing training data according to embodiments of the present disclosure can minimize a gap between a real domain and a virtual domain by generating the plurality of virtual images based on the real image and generating a virtual environment similar to the real world. Subsequently, the apparatus and the method can maximize the effect of making the virtual image resemble the real image by performing the DA.

The apparatus and the method for enhancing training data according to embodiments of the present disclosure can improve the overall performance of a vision tester in determining good quality and poor quality, by generating a training sample that is difficult to establish in the real world.

DETAILED DESCRIPTION

Figure 1:
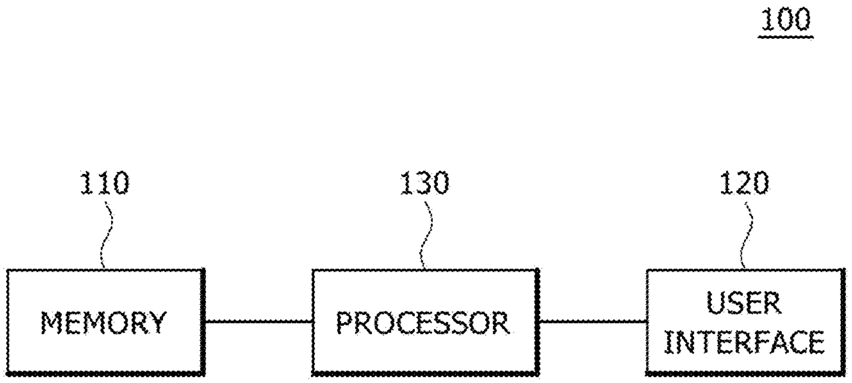
FIG. 1 is a block diagram of an apparatus for enhancing training data, according to an embodiment of the present disclosure.

An apparatus for and a method of enhancing training data according to embodiments of the present disclosure are described below with reference to the accompanying drawings. For clarity and convenience in description, thicknesses of lines, sizes of constituent elements, and the like may be illustrated in a non-exact proportion in the drawings. In addition, terms used hereinafter to refer to constituent elements according to embodiments of the present disclosure are defined by considering their respective functions and may be adjusted according to a user's or manager's intentions or to established practices. Therefore, these terms should be contextually defined in light of the present specification.

In the following description, when a component, device, element, or the like of the present disclosure is described as having a purpose or performing an operation, function, or the like, the component, device, or element should be considered herein as being "configured to" meet that purpose or to perform that operation or function.

Figure 3A:
Figure 3B:
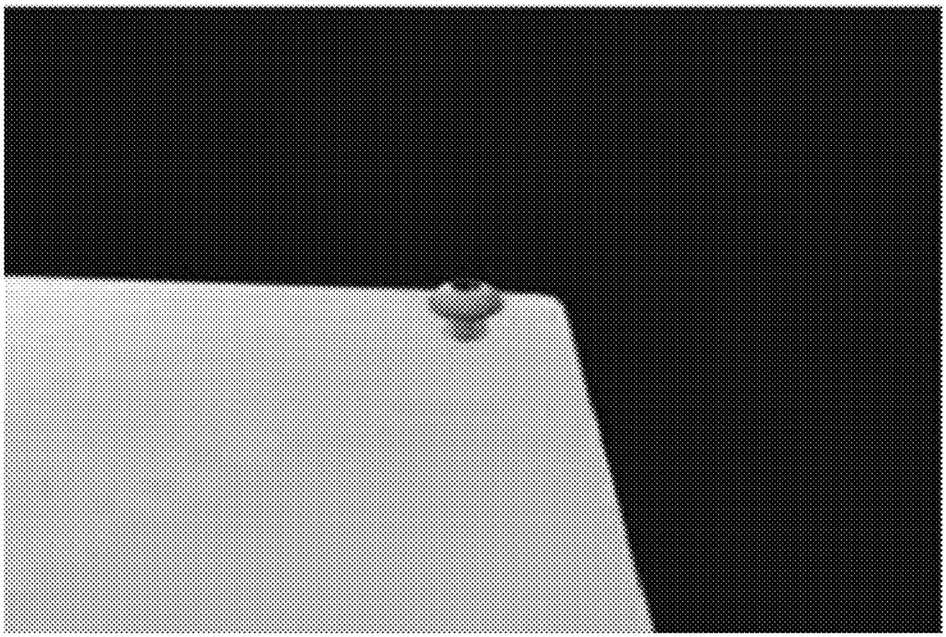
Figure 4:
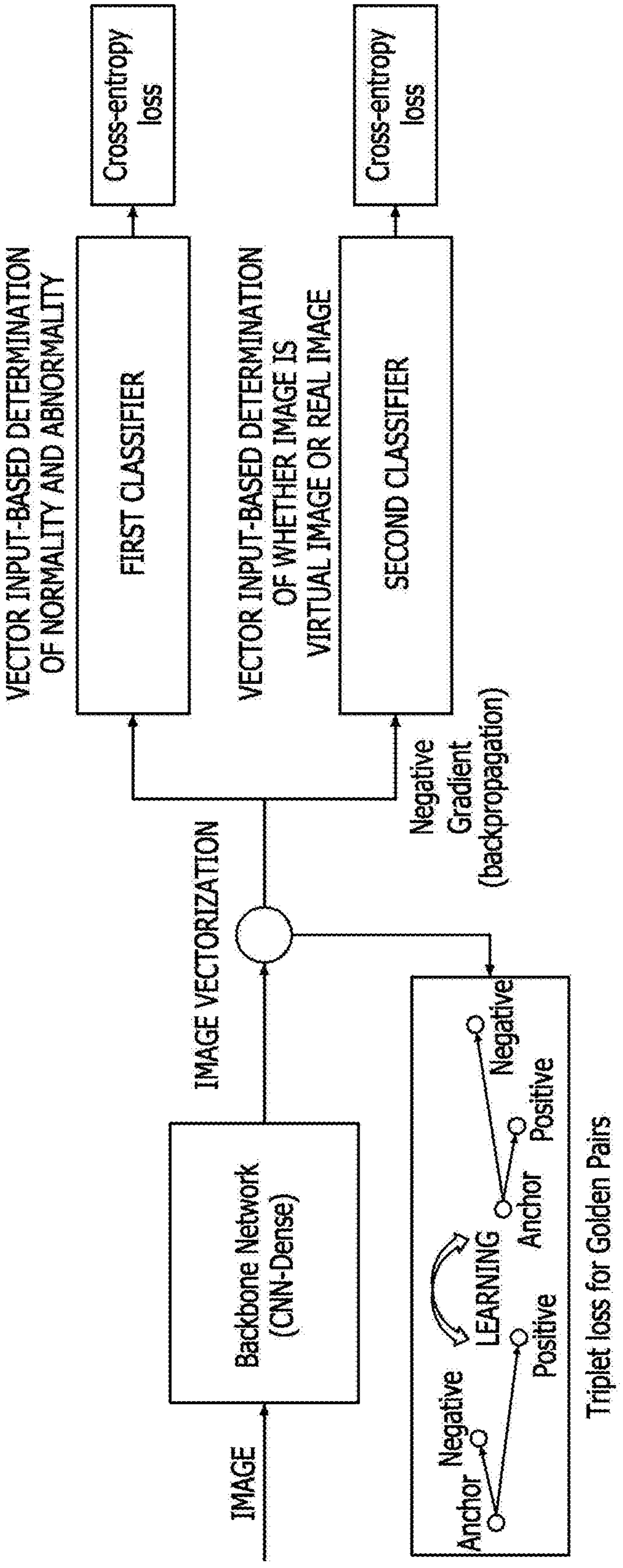
FIG. 4 is a diagram for describing domain adaptation training, according to an embodiment of the present disclosure.
Figure 5A:
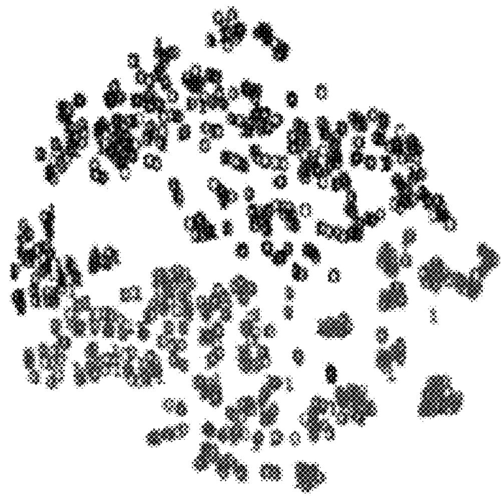
FIGS. 5A-5C are diagrams illustrating vector distributions that appear before and after domain adaptation training, according to an embodiment of the present disclosure.
Figure 5B:
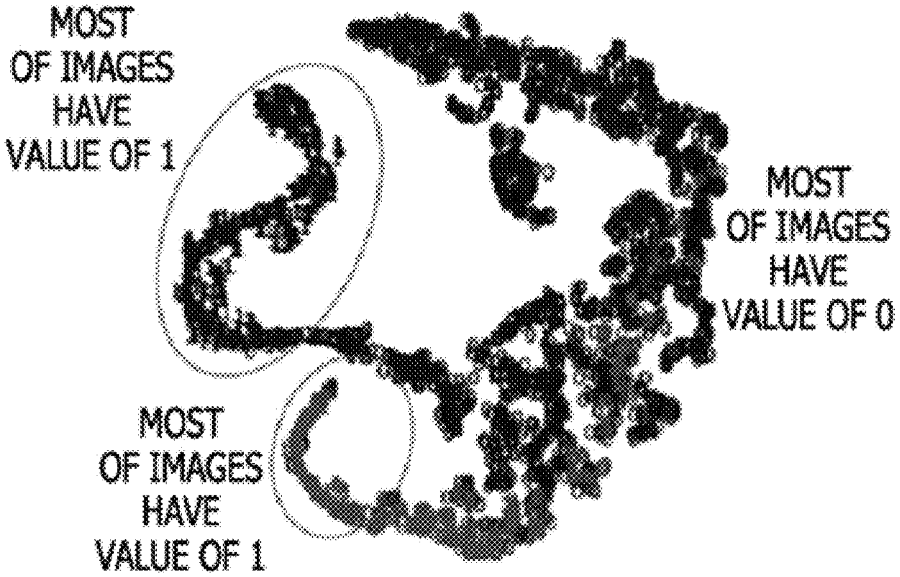
Figure 5C:
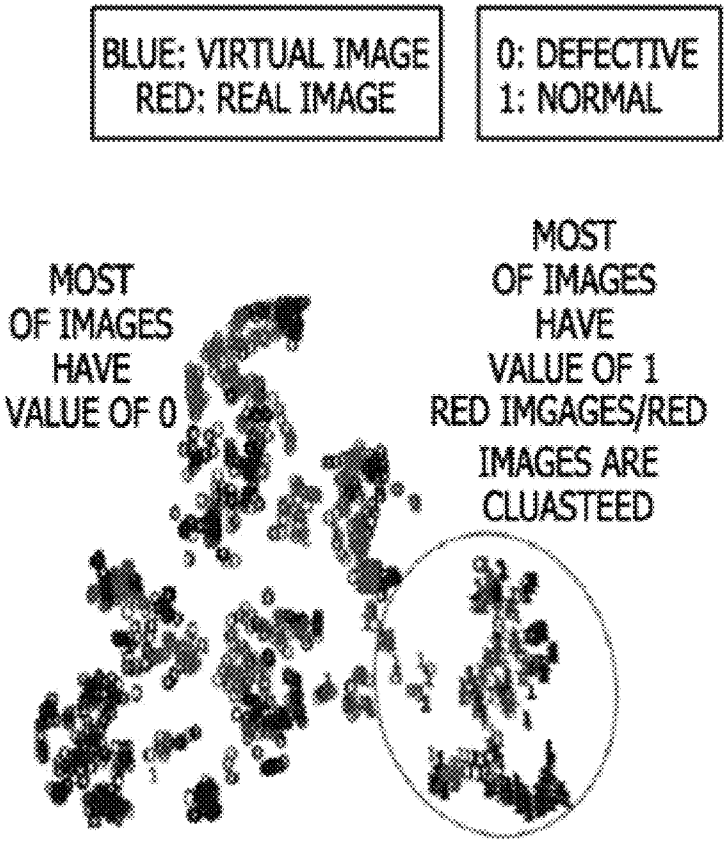

FIG. 1 is a block diagram of an apparatus for enhancing training data, according to an embodiment of the present disclosure. FIGS. 2A-3B are photographs for describing a virtual image generated based on a real image, according to an embodiment of the present disclosure. FIG. 4 is a diagram for describing domain adaptation training, according to an embodiment of the present disclosure. FIGS. 5A-5C are diagrams illustrating vector distributions that appear before and after the domain adaptation training, according to an embodiment of the present disclosure.

With reference to FIG. 1, an apparatus 100 for enhancing training data according to the first embodiment of the present disclosure includes a memory 110, a user interface 120, and a processor 130.

The memory 110 is configured to store a configuration in which to store data associated with operation of the apparatus 100 for enhancing training data. Stored in the memory 110 may be a program (e.g., an application or an applet) or the like that, when executed by a processor, cause the processor to generate a plurality of virtual images based on real image of the real world, generate a golden pair based on a level of similarity between the real image and the virtual image, and perform domain adaptation training on the real image and the virtual image. The program or the like may be stored in the memory 110 in the form of computer-readable instructions. Information that is stored in the memory 110 may be selected by the processor 130 whenever necessary. In embodiments, stored in the memory 110 are an operating system for operating the apparatus 100 for enhancing training data and various types of data that are generated during a process of executing the program (e.g., the application or the applet). As used herein, the memory 110 may collectively refer to a non-volatile storage device that keeps information stored without being supplied with electric power and a volatile storage device that needs to be supplied with electric power to keep stored information. In addition, the memory 110 may perform a function of temporarily or permanently storing data that are processed by the processor 130. Examples of the memory 110 may include a magnetic storage medium and a flash storage medium in addition to the volatile storage device that needs to be supplied with electric power to keep information stored. However, the scope of the present disclosure is not limited to these mediums.

The user interface 120 is provided to input or output information necessary to operate the apparatus 100 for enhancing training data. The user interface 120 may operate as an input device or an output device. In a case where the user interface 120 operates as an input device, the input device may be realized as, for example, a keyboard, a mouse, a touch pad, a touch screen, a touch button, or the like. In a case where the user interface 120 operates as an output device, the output device may be realized as a thin film transistor-liquid crystal display (TFT-LCD) panel, a light-emitting diode (LED) panel, an organic LED (OLED) panel, an active matrix OLED (AMOLED), a flexible panel, or the like.

The processor 130 may control the overall operation of the apparatus 100 for enhancing training data. According to an embodiment, the processor 130 may be realized as an integrated circuit, a system-on-chip, or a mobile AP.

The processor 130 may generate the plurality of virtual images based on the real image of the real world. The processor 130 may also generate the golden pair based on the level of similarity between the real image and the virtual image. The processor 130 may additionally perform the domain adaptation training on the real image and the virtual image.

The operation of the processor 130, according to embodiments, is described in more detail below.

The processor 130 may generate the plurality of virtual images with respect to the real image by changing at least one a distance, a pitch, or a yaw, with respect to the real image. The processor 130 may generate the virtual image using 3D modeling, such as CATIA, Pixyz, and Unity3D. The processor 130 may also generate the virtual image using a neural network-based generation model, such as NeRF or GAN.

Figure 2A:
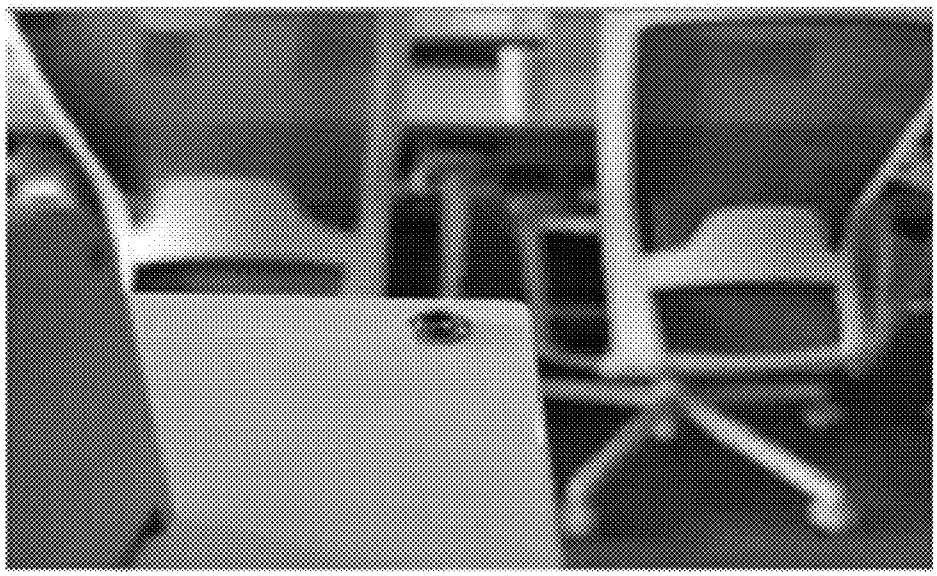
FIGS. 2A-3B are photographs for describing a virtual image generated based on a real image, according to an embodiment of the present disclosure.
Figure 2B:
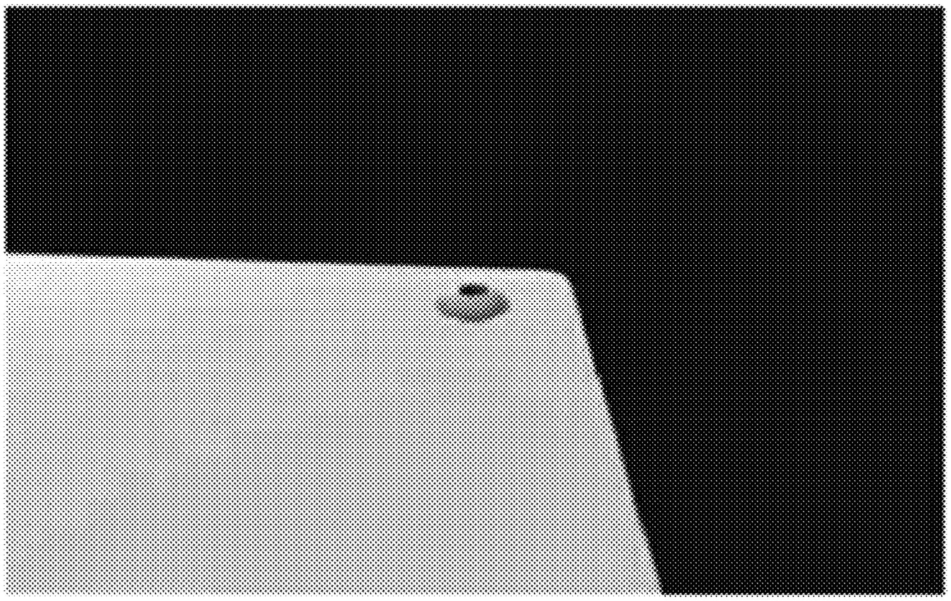

For example, the processor 130 may make changes by a distance of 5 cm and an angle of 30 degrees with respect to a real image of an assembling screw that is normally fastened as illustrated in FIG. 2A. As a result, the processor 130 may generate the virtual image as illustrated in FIG. 2B. In addition, the processor 130 may make changes by a distance of 5 cm and an angle of 30 degrees with respect to the real image of the assembling screw that is abnormally fastened, as illustrated in FIG. 3A. As a result, the processor 130 may generate the virtual image, as illustrated in FIG. 3B.

When the virtual image is generated with respect to the real image, the processor 130 may label each of the following: real image, virtual image, normal data, and abnormal data. For example, the real image may be determined to be normal or abnormal. Accordingly, the virtual image generated based on the real image may be labeled as normal or abnormal. For example, the virtual image generated based on the normal real image may be labeled as normal, and the virtual image generated based on the abnormal real image may be labeled as abnormal.

When a sufficient set of labeled data is generated, the processor 130 may generate the golden pair based on the level of similarity between the real image and the virtual image. The golden pair may refer to the pairing of the real image with the virtual image being most similar to the real image. Therefore, the processor 130 may compute the level of similarity between the real image and each of the virtual images generated based on the real image, and may identify the virtual image having the highest level of similarity with the real image as the golden pair. The processor 130 may compute the level of similarity between a virtual image and the real image using various methods, such as feature matching, a histogram, and a mean square error (MSE), in image processing and computer vision fields.

When the golden pair is generated, the processor 130 may perform domain adaptation training on the real image and the virtual image. For example, the processor 130 may perform domain adversarial training.

In an example, the processor 130 may convert the real image and the virtual image into vectors. The processor 130 may then perform triplet loss on the golden pair of the real image and the virtual image, among the vector-converted images. Furthermore, the processor 130 may cause the triplet loss-performed images to be classified into normal images and abnormal images using a first classifier. The processor 130 may also cause the triplet loss-performed images to distinguishable between the virtual image and the real image using a second classifier.

For example, with reference to FIG. 4, the processor 130 may convert the real image and the virtual image into vectors in a hidden space using backbone networks, Resnet-101 and Compact CNN. The processor 130 may extract feature vectors from the real image and the virtual image.

Thereafter, the processor 130 may perform the triplet loss on the golden pair of the real image and the virtual image, among the vector-converted images.

The triplet loss that is to be performed, for example, in a case where the real image, among the gold-paired images, is set as an anchor is described. In this case, the processor 130 may set the virtual image, that is gold-paired with the anchor-set real image, to be positive. Furthermore, the processor 130 may randomly select an image among the images other than the positive-set virtual image, and may set the selected image to be negative.

Thereafter, the processor 130 may perform the domain adversarial training. The processor 130 may cause the triplet loss-performed images to be classified into the normal images and the abnormal image using the first classifier. The processor 130 may cause the triplet loss-performed images to be indistinguishable from the virtual image and the real image using the second classifier. The processor 130 may perform back propagation using a negative gradient in order to perform training in such a manner that the real image and the virtual image are not distinguishable from each other in a vector expression space.

The first classifier may be configured as, for example, a multi-layer perceptron (MLP). The first classifier may be trained with cross entropy loss, and thus a weight for the classification into the normal image and the subnormal image may be adjusted. The second classifier may be configured as, for example, a multi-layer perceptron (MLP). The second classifier may be trained with cross entropy loss, and thus a weight for the classification into the real image and the virtual image may be adjusted. The first classifier and the second classifier may be trained to similarly acquire a probability distribution between the triplet loss-performed real image and virtual image.

In an embodiment, the domain adaptation as described above is performed, thereby making the virtual image, which is easy to generate for various types of renderings, appear in a compatible manner with the real image. Consequently, the performance in AI vision quality testing can be advanced.

For example, when the real image and the virtual image are input into the backbone network, a result as illustrated in FIG. 5A can be output. From FIG. 5A, it can be seen that the virtual images and the real images are definitely distinguished from each other, but that the normal images and the abnormal (defective) images are mixed, leading to poor classification performance. In addition, when the training involves determining whether the virtual image and the real image are normal or abnormal, a result as illustrated in FIG. 5B can be output. From FIG. 5B, it can be seen that the virtual images and real images are primarily classified into the normal images and the abnormal (defective) images. In addition, when the training involves the domain adaptation according to embodiments of the present disclosure, a result as illustrated in FIG. 5C can be output. From FIG. 5C, it can be seen that, when the training involves mixing the virtual image and the real image, the normal images and the abnormal images are classified.

The apparatus 100 for enhancing training data, according to embodiments of the present disclosure, can achieve a balance in data on the real world by generating a training sample group that is insufficient in the real world. In addition, the apparatus 100 for enhancing training data, according to embodiments of the present disclosure, can minimize a gap between the virtual image and the real image by utilizing a DA technology. In addition, the apparatus 100 for enhancing training data, according to embodiments of the present disclosure, can minimize the gap between the real image and the virtual image by generating the virtual image based on the real image. Subsequently, the apparatus can maximize the effect of making the virtual image resemble the real image by performing the DA. In addition, the apparatus 100 for enhancing training data, according to embodiments of the present disclosure, can rapidly obtain good-quality training data and at the same time can solve a problem of an imbalance in data on the real world by adding the virtual image generated based on the real image to a training sample insufficient in the real world.

Figure 6:
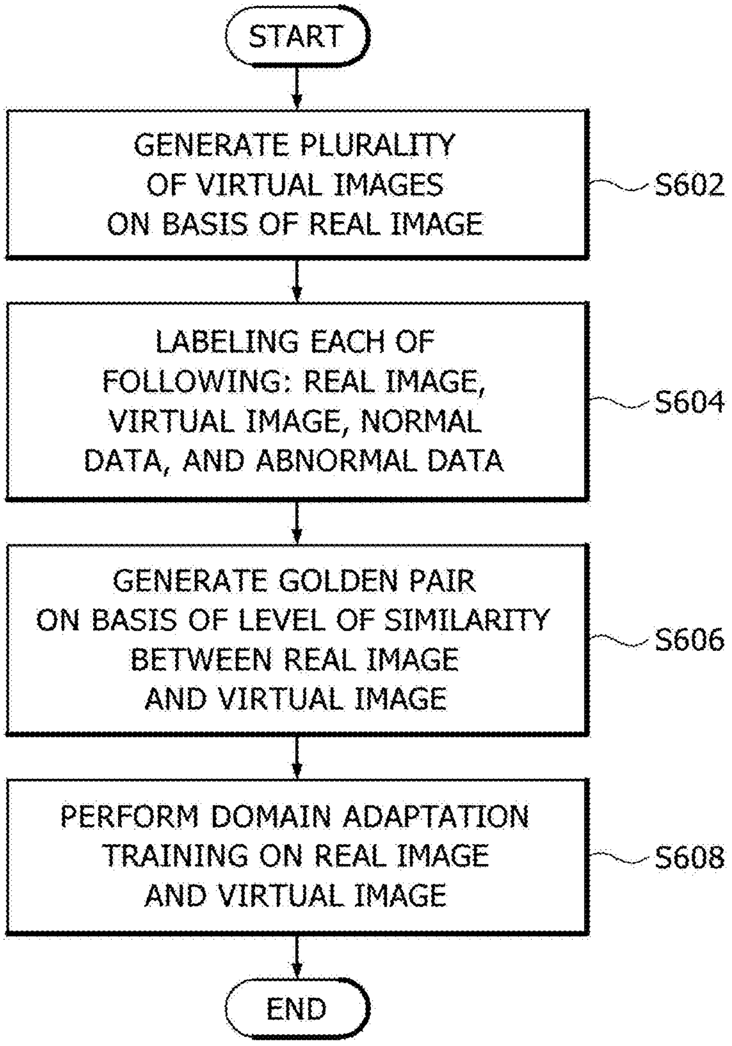
FIG. 6 is a flowchart of a method of enhancing training data, according to an embodiment of the present disclosure.

FIG. 6 is a flowchart that of a method for enhancing training data, according to an embodiment of the present disclosure. The method may be performed by the processor 130, for example.

In an operation S602, the processor 130 generates a plurality of virtual images based on a real image of the real world. The processor 130 may generate the plurality of virtual images with respect to the real image by changing at least of a distance, a pitch, or a yaw with respect to the real image.

In an operation S604, the processor 130 labels real image, virtual image, normal data, and abnormal data. For example, the real image may be determined to be normal or abnormal. Accordingly, the virtual image generated based on the real image may be labeled as normal or abnormal.

In an operation S606, the processor 130 generates a golden pair based on the level of similarity between the real image and the virtual images. For example, the processor 130 may compute the level of similarity between the real image and each of the virtual images generated based on the real image. The processor may then pair the real image with the virtual image having the highest level of similarity to the real image, thereby generating the golden pair including the real image and the virtual image.

In an operation S608, the processor 130 performs domain adaptation training on the real image and the virtual image. For example, the processor 130 may perform domain adversarial training. The processor 130 may convert the real image and the virtual image into a vector and may perform triplet loss on the golden pair of the real image and the virtual image, among the vector-converted images. Furthermore, the processor 130 may cause the triplet loss-performed images to be classified into normal images and abnormal images using the first classifier. The processor may also cause the triplet loss-performed images not to be distinguished between the virtual images and the real image using the second classifier.

As described above, the apparatus and the method for enhancing training data according to embodiments of the present disclosure can perform the domain adaptation training by generating a virtual image based on a real image, and generating a triplet loss-based golden pair. As a result, the real image and the virtual image are compatible with each other, and thus data on the real image and the virtual can be efficiently used together. Furthermore, good-quality training data on various cases (a normal case and an abnormal case) can be obtained.

The apparatus and the method for enhancing training data according to second embodiments of the present disclosure can solve the problem of an imbalance in data on the real world and can reduce work man-hours necessary to generate training data. This can be achieved by generating the training data at a level of being applicable to artificial imbalance training.

The apparatus the method for enhancing training data according to embodiments of the present disclosure can minimize a gap between a real domain and a virtual domain by generating a plurality of virtual images based on a real image, and generating a virtual environment similar to the real world. Subsequently, the apparatus and the method can maximize the effect of making the virtual image resemble the real image by performing the DA.

The apparatus and the method for enhancing training data according to embodiments of the present disclosure can improve the overall performance of a vision tester in determining good quality and poor quality by generating the training sample that is difficult to establish in the real world.

The embodiments of the present disclosure are described only in an illustrative manner with reference to the accompanying drawings. It should be understood by a person of ordinary skill in the art to which the present disclosure pertains that various modifications could be made to the embodiments and that various equivalents thereof could be implemented.

Therefore, the proper technical scope of the present disclosure should be defined by the following claims.

What is claimed is:

1. An apparatus for enhancing training data, the apparatus comprising:

a memory storing a program; and a processor coupled to the memory and configured to execute the program, wherein the processor is configured to:

generate a plurality of virtual images based on a real image, generate, based on respective levels of similarity between the real image and virtual images among the plurality of virtual images, a golden pair that pairs the real image with a virtual image among the plurality of virtual images, and perform domain adaptation training on the real image and the virtual image that is paired with the real image in the golden pair, wherein performing domain adaptation training, the processor is configured to:

convert the real image and the plurality of virtual images into vectors, perform triplet loss on the golden pair of the real image and the virtual image that is paired with the real image, among the vector-converted images, cause, using a first classifier, the triplet loss-performed images to be classified into normal images and abnormal images, and cause, using a second classifier, the triplet loss-performed images to be indistinguishable between the virtual image and the real image.

2. The apparatus of claim 1, wherein the processor is configured to generate the plurality of virtual images based on the real image by changing at least one of a distance, a pitch, or a yaw, with respect to the real image.

3. The apparatus of claim 1, wherein the processor is further configured to label each image as i) a real image or a virtual image and ii) normal data or abnormal data.

4. The apparatus of claim 1, wherein the processor is configured to:

compute a level of similarity between the real image and each of the virtual images among the plurality of virtual images generated based on the real image, and pair the real image with a virtual image having a highest level of similarity to the real image, thereby generating the golden pair that pairs the real image with the virtual image.

5. A method of enhancing training data, the method comprising:

generating, by a processor, a plurality of virtual images based on a real image;

generating, by the processor, based on respective levels of similarity between the real image and virtual images among the plurality of virtual images, a golden pair that pairs the real image with a virtual image among the plurality of virtual images; and performing, by the processor, domain adaptation training on the real image and the virtual image that is paired with the real image in the golden pair, wherein performing the domain adaptation training includes:

converting the real image and the virtual image that is paired with the real image into vectors, performing triplet loss on the golden pair of the real image and the virtual image, among the vector-converted images, causing, using a first classifier, the triplet loss-performed images to be classified into normal images and abnormal images, and causing, using a second classifier, the triplet loss-performed images to be indistinguishable between the virtual image and the real image that is paired with the real image.

6. The method of claim 5, wherein generating the plurality of virtual images comprises generating the plurality of virtual images based on the real image by changing at least one a distance, a pitch, or a yaw, with respect to the real image.

7. The method of claim 5, wherein generating the plurality of virtual images includes labeling each image as i) a real image or a virtual image and ii) normal data or abnormal data.

8. The method of claim 5, wherein generating the golden pair includes:

computing a level of similarity between the real image and each of the virtual images generated based on the real image, and pairing the real image with a virtual image, among the plurality of virtual images, having a highest level of similarity with the real image, thereby generating the golden pair that pairs the real image with the virtual image.

* * * * *